United States Patent [19]
Soref

[11] 4,143,941
[45] Mar. 13, 1979

[54] LOW LOSS OPTICAL DATA TERMINAL DEVICE FOR MULTIMODE FIBER GUIDE OPTICAL COMMUNICATION SYSTEMS

[75] Inventor: Richard A. Soref, Newton Centre, Mass.

[73] Assignee: Sperry Rand Corporation, New York, N.Y.

[21] Appl. No.: 856,424

[22] Filed: Dec. 1, 1977

[51] Int. Cl.² .................................................. G02B 5/14
[52] U.S. Cl. ................................. 350/96.16; 350/96.17
[58] Field of Search ............. 350/96.13, 96.14, 96.15, 350/96.16, 96.17, 96.18, 96.20; 250/199

[56] References Cited

U.S. PATENT DOCUMENTS

| 3,874,781 | 4/1975 | Thiel | 350/96.16 |
| 4,008,947 | 2/1977 | Baües et al. | 350/96.14 |
| 4,027,153 | 5/1977 | Käch | 250/199 |

FOREIGN PATENT DOCUMENTS

2653815  6/1977  Fed. Rep. of Germany ........ 350/96.16

OTHER PUBLICATIONS

A. R. Nelson, D. H. McMahon, R. L. Gravel, "Electro-Optic Multiplexer for Large-Numerical-Aperture, Low-Loss Fibers," Optics Letters, vol. 1, No. 1, Jul. 1977, pp. 35–39.

*Primary Examiner*—John K. Corbin
*Assistant Examiner*—Rolf Hille
*Attorney, Agent, or Firm*—Howard P. Terry

[57] ABSTRACT

The active data terminal device employs an array of multiple mode optical fiber guides as input-output devices, each abutted against a flat input-output focal face of an electro-optically active plate provided with opposed deflection modulation electrodes. Opposite the input-output focal face is a cylindrical mirror surface for refocusing the multiple-mode light from any predetermined input fiber guide into a second one of the array of fiber guides as selected by the voltage applied to the electrode pair.

20 Claims, 11 Drawing Figures

LOW LOSS OPTICAL DATA TERMINAL DEVICE FOR MULTIMODE FIBER GUIDE OPTICAL COMMUNICATION SYSTEMS

The invention herein described was made in the course of or under a contract or subcontract thereunder with the United States Air Force.

BACKGROUND OF THE INVENTION

1. Field of the Invention

The invention pertains generally to the field of guided wave optical communication systems and more particularly relates to low loss optical-data single fiber terminal devices for performing multi-mode access coupling in data distribution networks, as well as multiplexing and demultiplexing functions in electrooptical data processing apparatus.

2. Description of the Prior Art

Experience in guided optical data communication methods, while earlier intensely concerned with the fiber optic bundle and single mode integrated optical techniques, now leads to the conviction that an intermediate approach, the multi-mode, single optical fiber technology, can be most successfully applied to a wide variety of communication problems, especially where moderate bandwidth and moderate distances are involved. Fabrication of passive interconnectors is simplified and the packing fraction losses characteristic of the fiber bundle method are eliminated. The single mode technology has been significantly advanced; however, important unsolved coupling problems still remain.

Simple light sources exist easily capable of coupling considerable power into available multiple mode, single fiber guides, and quite adequate photodetector devices for detecting the flow of light through such single fiber guides are also available. Evidently, the scheme for multiple mode, single fiber communication would be made useful if concepts existed for electrically controlling the routing of optical signals, so that data bussing, multiplexing, demultiplexing, and switching functions could be performed totally in the optical domain by reliable and inexpensive data terminals.

SUMMARY OF THE INVENTION

The present invention is an active reciprocal optical terminal device finding application in optical processing systems in which there is present a central data processor; a plurality of the novel active terminal devices located serially along a data bus in the form of a closed loop permits the controlled flow of optical data from a plurality of associated peripheral devices into the central data processing unit and vice versa. Each optical terminal device is conditioned to impress data on the optical stream of the optical fiber data bus in response to an electrical signal; thus, a light source is not required at each of the plurality of terminals.

The present invention provides a novel active data terminal device wherein each of a lineal array of multiple mode optical fiber input-output guides is abutted normally against a flat input-output focal face of an electrooptically active plate provided with appropriate deflection modulation electrodes on each of its two broad faces perpendicular to the plane of the focal face. Opposite that input-output face is a curved mirror surface for refocusing TE and TM multi-mode light from a predetermined input fiber guide into a second one of the array of fiber guides as selected by the voltage applied to the cooperating electrodes.

The chief attribute of the terminal is its very low insertion loss, which characteristic allows a large number of such terminals to be connected in series relation without degrading the signal-to-noise ratio of the optical bus. A total loss as low as 1.0 dB per terminal is readily demonstrated and even lower unit loss is theoretically possible to attain. In addition, single fiber coupling is simple. The novel terminal focuses both TE and TM mode light without significant loss to a desirable spot size largely independent of the fiber guide diameter and of the fiber's numerical aperture, so that most of the light source energy is usefully employed. The terminal additionally is fail safe, bidirectional, and achromatic and also features adjustable tapping and efficient normal incidence coupling of the optical fiber guides at the flat input-output surface.

DESCRIPTION OF THE PREFERRED EMBODIMENTS

The optical data terminal device of the present invention finds a variety of applications in optical processing systems such as have a central data processing unit and a plurality of peripheral devices associated with that central processing unit and such as permit the controlled flow of data in coded form from each peripheral device into the central data processing unit and vice versa. While the invention is not limited to use in such a configuration, it is attractive for use in the typical serial data processing system of FIG. 1 where it serves as an active data terminal device, performing the function of an active optical controllable data directional coupler.

Figure 1:
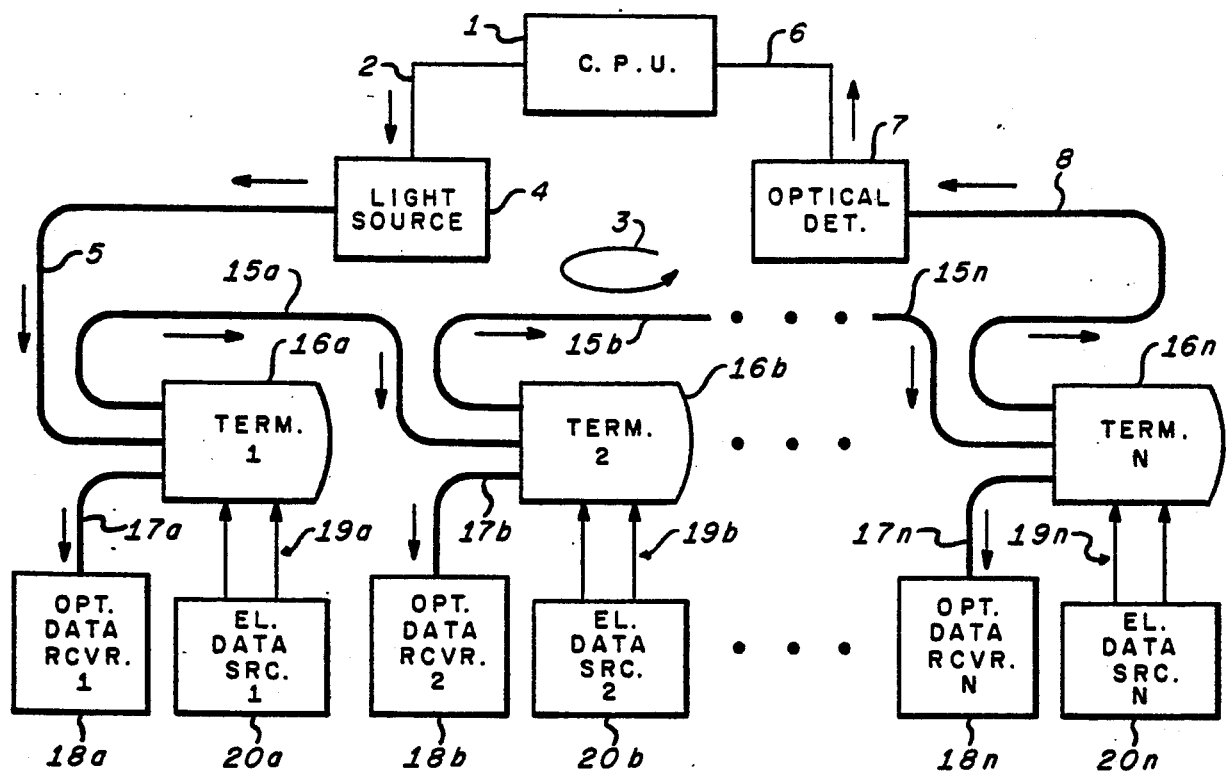
FIG. 1 is a block diagram showing components and optical and electrical interconnections of the components of an electro-optic data processing terminal.

As is seen in FIG. 1, the optical processing system involves a primary loop 3 having a closed loop state. In the latter, light may continuously flow, for instance, within the optical fiber guide 8 to be detected by a conventional optical detector 7 for conversion into an electrical signal on electrical lead 6 of a predetermined amplitude, which amplitude is a function of the light level incident upon detector 7. The electrical signals on lead 7 may be used in the central data processor unit 1 in a variety of conventional ways, therein to be converted into an output electrical signal of predetermined magnitude appearing on lead 2. Light source 4, which may be a conventional diode or other laser device, projects light of a corresponding level into the optical fiber guide 5. In one mode of operation, the light within optical fiber 5 is returned through the series of novel terminal devices 16a, 16b, . . . , 16n and through the intervening series-connecting optical fibers 15a, 15b, . .

..., 15n into optical fiber 8 for continuing recirculation. The loop 3 thus constitutes a primary optical data bus in the form of a single strand in a system advantageously involving only one light source 4, light sources are not required for each terminal device, and light source 4 is continuously operated when central processor 1 is not transmitting. A single fiber strand is selected permitting multi-mode transmission of the optical energy through the active terminals.

Each novel terminal device 16a, 16b, . . . , 16n has associated with it a respective electrical data source 20a, 20b, . . . , 20n respectively coupled via leads 19a, 19b, . . . , 19n to a terminal device. A modulated light stream emanates from light source 4 when the central processor 1 is transmitting, and light source 4 is continuously operating when the central processor 1 is receiving. Information may be put on the bus loop 3 at any terminal location by applying electrical signals on lead 19a, for example, that will modulate the continuous wave light traversing terminal device 16a. Thus, source 20a communicates with the central processor 1. For information pick off at a particular terminal, a steady electrical level (a d.c. bias voltage) is applied to one of the appropriate leads 19a, 19b, et cetera. For example, a tap-off bias on lead 19a will fractionally divert the optical stream arriving at terminal 16a into fiber guide 15a and into data receiver 18a. It is understood that the diverted light may perform a useful function by supplying predetermined data for processing or causing various operations within optical data receiver 18a. On the other hand, receiver 18a may be a simple conventional device for absorbing all of the energy of the diverted light signal. It will be understood that electrical data sources 20b, . . . , 20n and optical data receivers 18b, . . ., 18n may be operated in the analagous manner, for example. It is seen that the fiber optical bus makes use of the novel terminal devices in the modular tee configuration while desirably employing multi-mode light propagation therethrough.

In order to realize an active multi-mode optical terminal device that has desirably low insertion loss and has other worthy attributes, normal incidence of light within an optical fiber is provided into the terminal device and a mirror arrangement is then used for efficient one-dimensional focusing of the now divergent incident light into a predetermined output fiber or fibers. Accordingly, the novel active terminal devices may be identified as mirror terminal devices.

Figure 2:
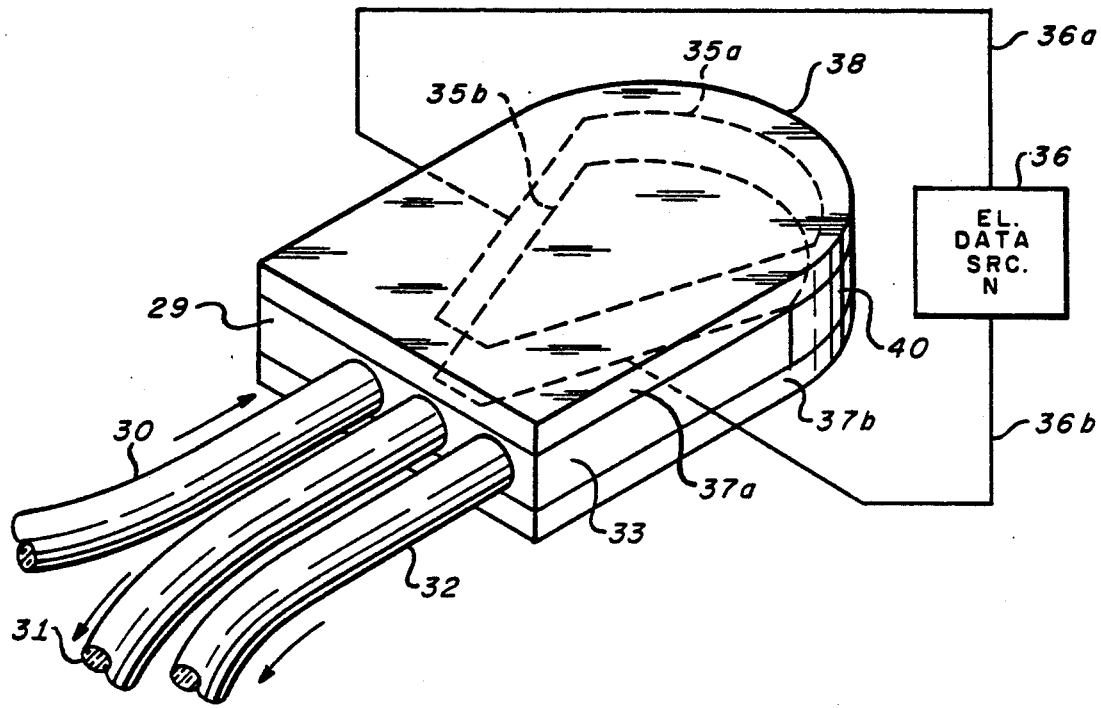
FIG. 2 is a perspective view of the novel active data terminal of the present invention.

Referring especially to FIG. 2, a first embodiment of the mirror terminal device will be explained. Its active element is a plate 33 of a conventional electrooptically active material such as a Z-cut single crystal plate of LiTaO$_3$ or LiNbO$_3$ lying between one sixteenth inch thick protective glass plates 37a, 37b, cemented on the opposed sides of the plate 33. Glycol phthalate or a similar optically transparent cement may be used in the two interfaces between plate 33 and plates 37a and 37b. The thickness of the crystal plate 33 may be about 3 mils thick, for example, but is selected, in any event, so as to approximately match the core diameter of the multi-mode fiber guides to be used in the data bus system.

The input-output end 29 of the mirror terminal device is ground and polished to have substantially optical flat characteristics. The end 38 of plate 33 opposite flat end 29 is ground and optically polished in one form of the invention into a circular cylindric shape. A metal coating of good optically reflecting nature is applied by vacuum distillation or by other well known processes to the curved end 38 to form a totally reflecting mirror 40. Mirrors formed of metals such as gold, chromium, silver, or aluminum may be employed.

An array of individual optical fiber guides with their faces cut and polished at right angles to their respective axes, such as fibers 30, 31, 32, is disposed with the faces directly contacting flat surface 29, so that the individual fiber guides are butt-coupled to the flat surface 29 at normal optical incidence. While three such fiber guides are shown in FIG. 2, from one to four or more fiber guides will be used in actual practice depending upon the application of the mirror terminal device. In FIG. 2, the illustrated fiber guides include a bus input 30, a bus output 31, and a local tap fiber 32, these fibers respectively corresponding to fiber guides 5, 15a, and 17a of FIG. 1, for example. To control by modulation the multi-mode light passing in FIG. 2 from bus input 30 through the mirror terminal device into output bus 31, and therefore consequently to control the light passing out of the local tap fiber 32, metal electrically-conductive electrodes 35a, 35b of appropriate shape are placed on opposed sides of the active plate 33 using a conventional photolithographic process. Electrodes 35a, 35b may take various shapes, as will be further discussed, and are often oppositely charged, as by the electrical data source 36 via leads 36a, 36b.

Figure 3:
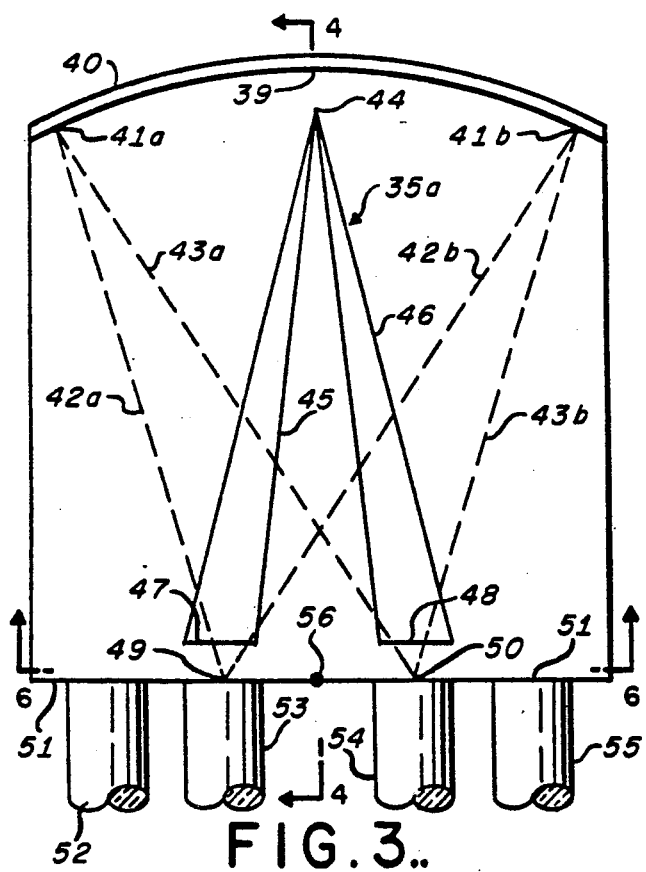
FIG. 3 is a plan view of the device of FIG. 2.
Figure 4:
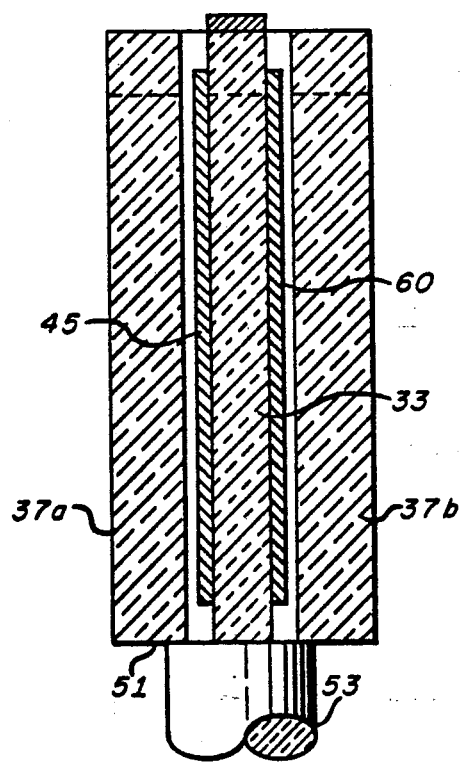
FIG. 4 is a cross section view of the invention taken along the lines 4—4 of FIG. 3.
Figure 5:
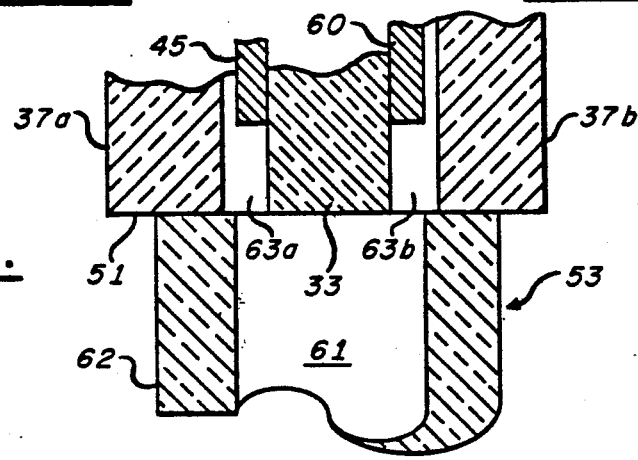
FIG. 5 is an enlargement of a fragment of FIG. 4.

FIGS. 3 and 4 provide plan and side views of an embodiment of the novel mirror terminal cooperating with light flowing, for example, in any of four associated fiber guides 52, 53, 54, 55. The side view shown in FIG. 4 illustrates the direct butt coupling relation of fiber guide 53, for example, with respect to the flat face 51 of the terminal. The enlarged view in FIG. 5 shows how the flat end of the core 61 of fiber 53 and of its surrounding cladding 62 interface intimately with the face 51 of active plate 33 in direct butt-coupled relation, the actual interfaces being made by a very thin transparent layer of glycol phthalate, for example, or of a high index liquid which may also be used to fill minor voids in the structure such as at 63a, 63b at the ends of thin-film electrodes 45, 60.

In FIGS. 3 and 4, it will be understood that the multi-mode light emitted generally at 49 by fiber guide 53, for example, into the active plate 33 diverges within boundaries 42a, 42b in the plane of the drawing of FIG. 3, but is highly trapped by multiple reflection between dielectric interfaces with layers 63a, 63b in the plane of the drawing of FIG. 4. Thus, the mirror 40 performs one dimensional refocusing of the light striking it, as at points 41a, 41b, focusing it within boundaries 43a, 43b generally at focal point 50 at which the output fiber guide 54 is located. In the other plane shown in FIG. 4, the trapped light is multiply reflected at the surfaces of plate 33 and is therefore generally all focused at point 50. As is well known, optical guides such as guides 52 through 55 propagate energy in both optical polarizations and in many modes of propagation. However, all of this energy is readily reflected in the same manner by mirror 40, even if the material of plate 33 is birefringent, although a quasi-isotropic crystal like LiTaO$_3$ is somewhat to be preferred for the active plate 33.

The purpose of the novel mirror terminal device is to tap off a part of an internally located fiber light cone, such as that generally defined by the boundaries 42a, 42b of FIG. 3 and, as far as possible, to regather completely the remaining multi-mode light into an output fiber guide such as at 54. In view of the properties of mirror 40, it is seen that one-to-one imaging of the fiber light is achieved by making the end 51 of the active plate 33 flat. Simple mirror equations show that the desired one-to-one refocussing of fiber light, whether of TM or TE mode, occurs on a focal plane located at a distance R from vertex 39 of the mirror. The distance R is the radius of curvature of mirror 40, where the center of curvature 56 is disposed on the flat input-output focal plane 51.

Consider the flow of light within active plate 33 in the absence of any potential difference between electrodes 35a, 35b. As in FIG. 3, the respective input and output fibers 53, 54 are equidistant from the center of curvature 56, and light from one of the fibers will be exactly refocussed into the other fiber independent of propagation mode. Similarly, a second pair of optical fiber guides, such as guides 52, 55, may be spaced by equal but larger distances on either side of point 56 and the same imaging from one of guides 52, 55 into the other will occur. Imaging is reciprocal since the reciprocity principle holds; it makes no difference which of a fiber pair is the input and which is the output. With the form illustrated, light can pass simultaneously in both directions, for example, from fiber 52 to fiber 55 and from fiber 54 to fiber 53, or vice versa.

In FIG. 2, generalized electrodes 35a, 35b were shown for altering the index of refraction of the active plate 33 therebetween and consequently for deflecting the refocused light from the output or bus fiber guide 31 to the tap fiber guide 32, for example. FIGS. 3 and 8 through 11 show particular sets of electrodes which may be thus used to modulate the optical energy flowing in bus loop 3. Combinations of long, thin triangular shapes are made as metal patterns, typically of gold and affixed to the opposed large faces of crystal plate 33, registered directly opposite each other. For this reason, the crystal plate 33 is Z cut so that the electric field between the opposed electrodes 35a, 35b is mainly parallel to the Z axis, thus achieving the largest possible electrooptic variation of the refractive index of the active plate 33 between electrodes 35a, 35b by the electrooptic coefficient $r_{33}$. When the electric field across plate 33 is zero, the energy flowing in FIG. 3 from fiber guide 53 to fiber guide 54 is maximum, hence the novel terminal device is fail-safe. Similarly, in the aforegoing example, the flow of light from fiber guide 55 to fiber guide 52 is symmetric and maximized. Because focusing is accomplished largely in an achromatic fashion by mirror 40 and by wave guiding between the parallel interfaces 63a, 63b, and because the refractive deflection effect produced by the electric field is not seriously frequency sensitive, the active modulation is substantially wave length insensitive, and the device is essentially achromatic over near-infrared and visible wave lengths. Propagation losses due to the electrodes are very low if they are made of a material such as gold.

Figure 7:
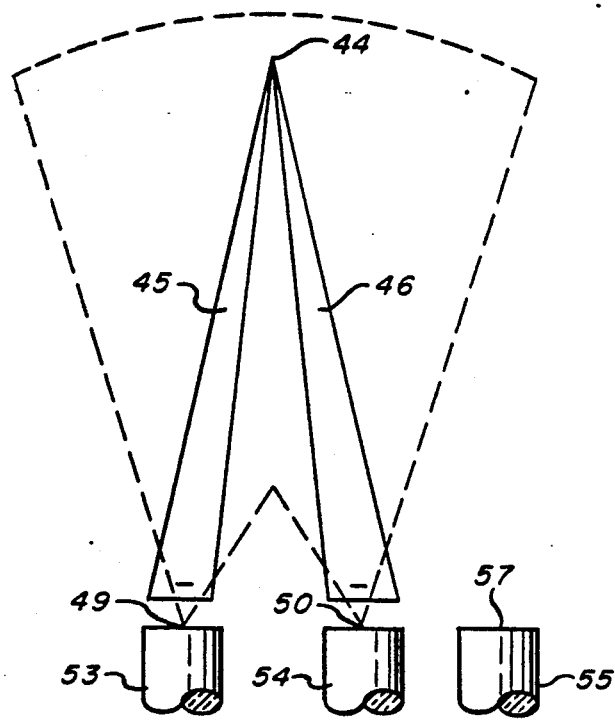
FIGS. 7, 8, 9, and 10 are fragmentary plan views similar to FIG. 3 of various electrode systems used with the invention.

With respect to the aforementioned electrode configurations, FIG. 7 illustrates the electrodes of FIG. 3 with respect to the zero deflection voltage boundary rays 42a, 42b, 43a, 43b of FIG. 3 used simply as convenient positional references. In FIGS. 3 and 7, one of the electrode pairs consists of a symmetric pattern of thin triangles or tapered wedges 45, 46 meeting at a symmetrically disposed point 44. The lower ends of triangles or wedges 45, 46 are located at the respective bus input and output fiber guides 53, 54. The electrode system 45, 46 may be charged at one potential to produce light deflection while its similarly shaped counterpart on the opposed side of active plate 33 is oppositely charged by source 36, for example. The upper and lower tapered wedges 45 are each sufficiently wide at their ends adjacent fiber guide 53 that the electric field, when present, intersects all light rays leaving the bus input fiber guide 53 and refracts a large portion of the light energy in a clockwise sense. The remaining electric field between the pairs of wedges 45 and the pairs of wedges 46 cooperates to cause additional deflection of the light rays, so that they are now focused generally at the point 57 of the tap fiber guide 55. With the electric field removed from the two electrode pairs 45 and 46, the light energy returns to fiber guide 54.

Figure 8:
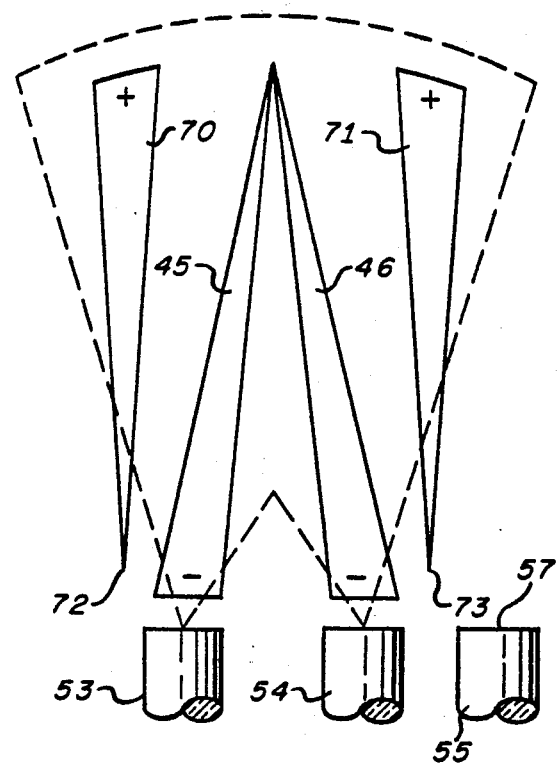

In FIG. 8, the pairs of wedge-shaped metal electrodes 45, 46 are again present and function as they did in the arrangement of FIG. 7. On the upper surface of the active plate 33 of FIG. 8, there is added a secondary pair of wedge-shaped metallic electrodes 70, 71. These are positively charged where the primary electrodes 45, 46 are negatively charged. Each electrode 45, 46, 70, 71 has a counterpart electrode on the opposite face of active plate 33, the corresponding electrodes on the opposed faces being equipotentially charged, as by an electrical data source 36.

The cooperating secondary electrodes 70, 71 are placed on opposite sides of the primary pair 45, 46 and, when charged as described, permit a substantially fifty percent reduction in the magnitude of the control voltage which would otherwise need to be supplied by source 36. This is brought about because the primary electrodes produce a negative change $-\Delta n$ in the effective index of refraction of the active plate 33 in their prism-shaped region, while the secondary electrodes 70, 71 produce a positive charge $+\Delta n$ in their particular prism-shaped region. The electrodes 45 and 70 are sufficiently close to each other that an abrupt index of refraction gradient of $2\Delta n$ appears therebetween.

Figure 9:
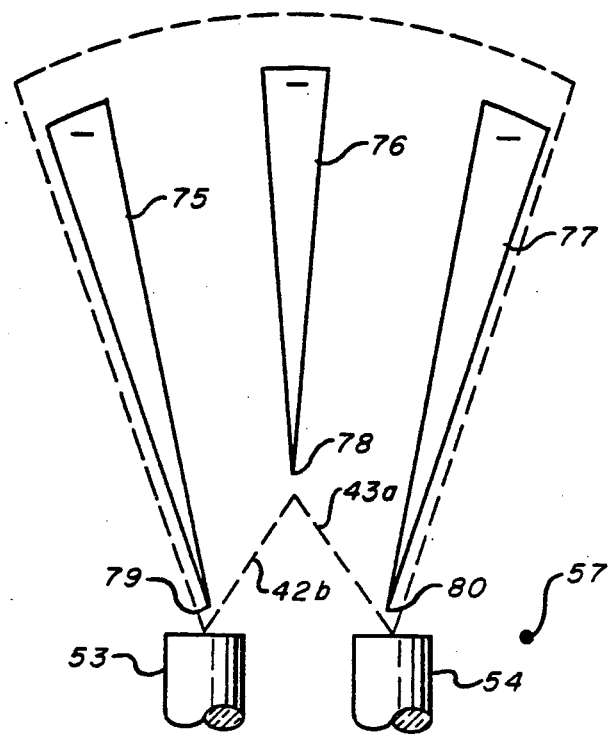
Figure 10:
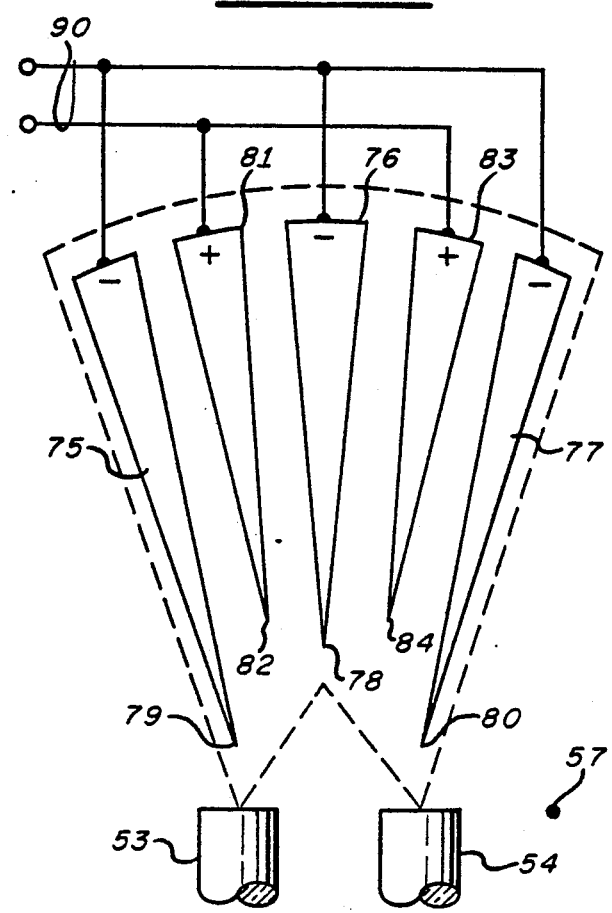
Figure 11:
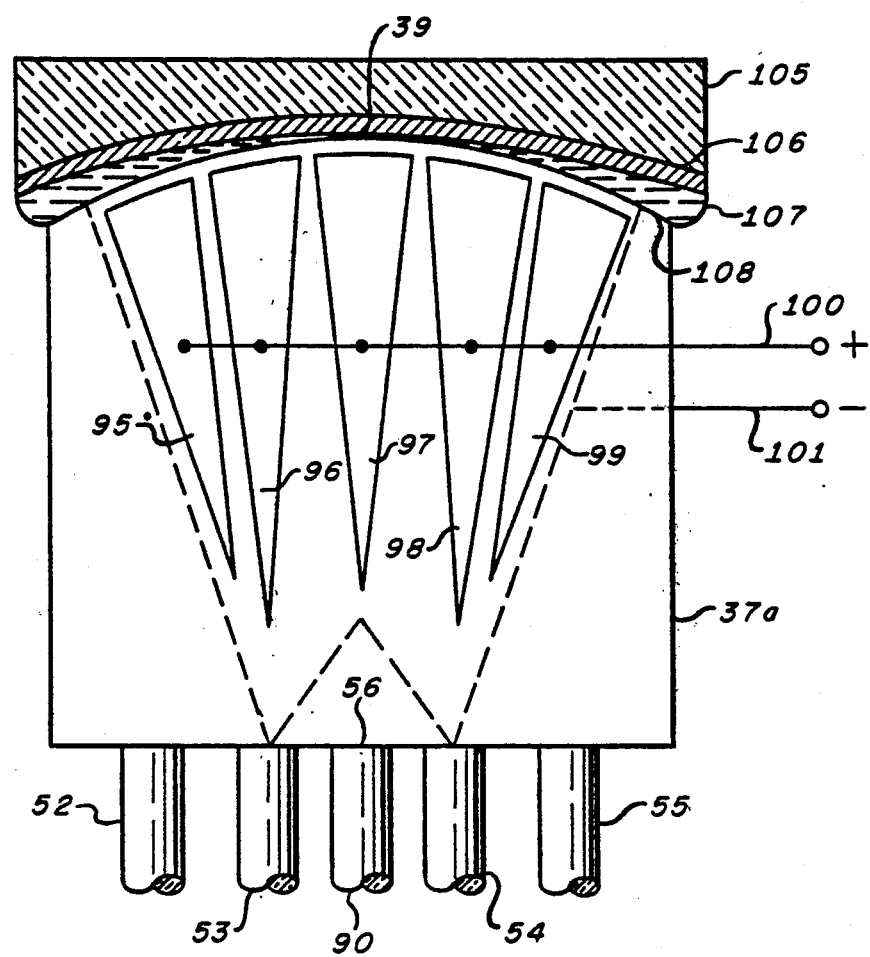
FIG. 11 is a plan view of a preferred embodiment of the invention.

In FIGS. 9 and 10, configurations of wedge-shaped metal electrodes are shown for achieving even greater angular deflection of the light cone emanating from the input bus fiber guide 53. The wedge-shaped electrodes 75, 77 of FIG. 9 take the form of one pair of tapered wedges with respective pointed or tapered ends 79 and 80 at the faces of fiber guides 53, 54 and an intermediate wedge 76 having its tapered end 78 disposed just above the intersection of the undeflected light boundaries 42b, 43a. The electrodes 75, 76, 77 are placed generally along radii and are all similarly charged. As in FIG. 8, the effectiveness of the electrode pattern may be enhanced by adding alternate positively charged radially-disposed vanes 81, 83 in a comb-like structure. In FIGS. 9 and 10, similar but oppositely charged electrode patterns may be placed in aligned registration on the opposite side of plate 33. If desired, a single extended electrode may be placed in FIG. 9 below plate 33 if that single electrode positively charged. A similar zero potential conductive electrode may be used under the active plate 33 of FIG. 10 in aligned registration with the multiple-wedge pattern.

In the form of the invention shown in FIG. 10, generally similar wedge shaped electrodes 75 through 76 are disposed in a fan shaped array beneath glass plate 37a on the surface of the electrooptically active plate 33, mirror 40 being formed as previously described. In the preferred form of the invention shown in FIG. 11, all the electrodes on the upper side of the device are charged instantaneously at the same potential. A similar fan-shaped array of wedge shaped electrodes lies on the opposite face of plate 33 in substantially perfect registration with the electrodes 95, 96, 97, 98, 99 of the upper array; at any one time the two arrays are oppositely charged, as is indicated by the polarity signs associated with the cooperating leads 100, 101. With no electric field present, the light flowing into the device from fiber 53 is refocused by mirror 40 substantially onto the output fiber guide 54. When sufficient voltage is applied, electric fields between the electrode arrays serve to "spoil" the quiescent focus and to refract the light and broaden the focal spot so that light enters tap fiber 55 and the additional tap fiber guide 90. The fiber guides may be used in cooperation as previously described. For example, light flowing into the device via fiber guide 90 can be deflected readily from guide 53 to guide 52, or from guide 54 to 55, depending on the optical alignment at zero voltage. The electrooptic modulation occurs for either polarity of applied voltage. The electrode systems of FIG. 3 may be proportioned to emphasize deflection of the light rays, while systems such as that of FIG. 12 depend generally upon broadening the focus so that light is admitted to additional output fiber guides. It will be apparent that modifications can be devised using combinations of the deflection and defocusing effects.

The mirror 40 in FIGS. 3 and 4 has been shown as integral with plate 33; that is, it is a metal layer 40 deposited directly on the curved crystal surface. It is equally possible and useful to employ an external mirror in the various embodiments; for example, a polished glass plate 105 with a concave surface that has been coated with a reflecting gold film, 106 as in FIG. 11. The external mirror 106 has substantially the same radius of curvature R as the crystal and is placed in direct contact at 39 with that uncoated curved crystal surface so that the external mirror's center of curvature coincides with point 56. There will normally be a small gap between the crystal plate 33 and the mirror 106, but this may be filled as at 107 with a fluid such as a silicone oil ($n = 1.55$) to keep optical scattering and reflection losses at those interfaces at a very low value and to minimize any effects of polishing defects on the crystal surface. In addition, if $R > 2$ cm., it is possible to use an external spherical mirror at 106 rather than one of cylindrical shape, the optical losses introduced by the substitution being small.

Figure 6:
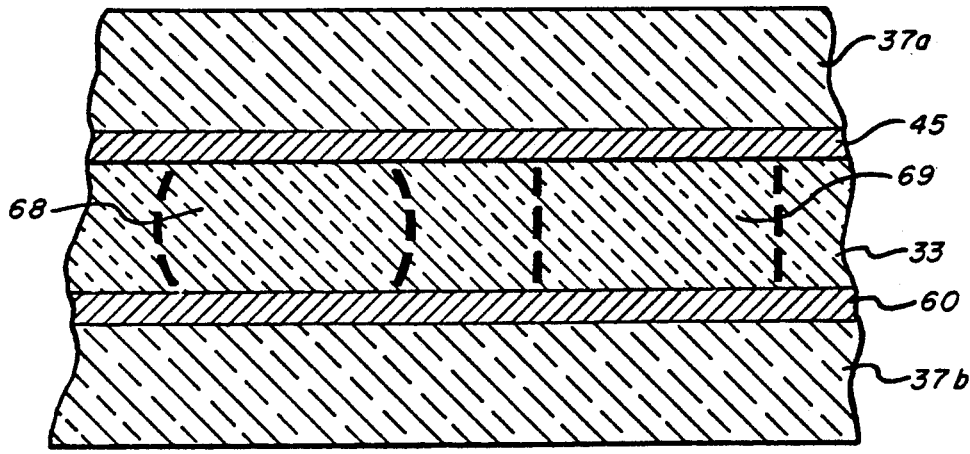
FIG. 6 is a cross section view of FIG. 3 taken along the lines 6—6 thereof.

Total sources of loss for each mirror terminal device are small, consisting of input-output loss, mirror loss, and losses at the coupling interface between the circular fiber guide 61 and the face 51 of the crystal plate 33 (FIGS. 5 and 6). Consider as an example an 85 micron diameter fiber core interfaced with a crystal plate 33 that is 75 microns thick; in this case, the input light cone will be truncated as at 68 in FIG. 6. Because the active optical focussing occurs in one dimension only, the output focal spot is rectangular as at 69 in FIG. 6 (85 microns wide and 75 microns high). Accordingly, in this example, there is a consequent input coupling loss, the fiber being wider than the active plate height. On the other hand, the crystal plate 33 could have been 85 microns thick, but then the 85 micron square output spot 69 would have covered an area greater than the cross section area of the fiber guide, causing an output coupling loss. In either alternative, the geometric mismatch is estimated to be substantially ten percent. If index of refraction matching fluids are not used at discontinuities in the optical path of the mirror terminal, the reflection loss between the optical fiber core 61 and the active plate 33 (assuming respective indices of refraction of 1.50 and 2.19) would be about four percent, or eight percent for two such interfaces. Because the mirror loss could be about five percent, the insertion loss would be approximately 23 percent for the cited example, or 1.1 dB. Abberation losses from the mirror are negligible for fibers close to center 56. Accordingly, the achievement of an insertion loss of 2 dB is readily demonstrated.

With respect to the modulation and tapping or light diversion function of the mirror terminal device, modulation of light in the novel device refers herein to the diversion or deflection of light out of the originally focused input light beam. In the one instance, the diverted light could travel to a black absorber at the perimeter of the active plate 33, such as an off-focus location at 55 of FIG. 8. Alternatively, it may be deflected into a tap fiber located at 55, such as fiber 55 itself for propagation of light to a photodetector. Alternatively, fiber guide 55 may be omitted and the photodetector may be bonded directly to surface 51 at deflection point 55.

It will be apparent to those skilled in the art that the invention can be adapted to provide light tapping in several additional ways. With fiber guide 53 in FIG. 3 serving as an input and fiber guide 54 as the output, a third fiber 55 positioned close to fiber guide 54 would normally, in the absence of an electric field, pick up a predetermined fraction of the light that would otherwise flow mainly into fiber guide 54. The ratio of this light diversion can be selected by stripping a predetermined part of the cladding at the ends of fiber guides 54, 55 so that their cores could be touching at the focal plane 51. Now, by varying the electric field across the active plate 33, the ratio of power flowing out of fiber guide 55 to that flowing out of fiber guide 54 may readily be controlled. Other variations of the tapping system will be apparent to those skilled in the art. The mirror terminal can function in a purely transmissive mode or in a reflective mode in which one fiber guide located on the optical axis serves as a guide for both directions of light propagation. In addition, a branching type of mirror terminal can be envisioned with one input fiber and two equal-power outputs modulated in unison.

Accordingly, it is seen that the invention provides a needed solution to problems of optical switching, multiplexing, and demultiplexing in a variety of optical data processing systems of which one form has been illustrated by way of example. The novel data terminal is reciprocal in nature, so that it readily acts as a multiplexer or as a demultiplexer. A system employing it has fail safe properties, because only one light source is required and because its greatest transmission obtains with zero deflection voltage. It handles unpolarized fiber light with large numerical aperture. Its very low insertion loss makes it useful in plural numbers in series connection so that many peripheral data sources may cooperate with a central data processor. It is essentially achromatic and, using normal-incidence butt-coupling of the input-output fiber guides, it is simple, compact, rugged, and easily constructed with no difficult alignment problems in manufacture.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A multi-mode propagation, light switching device comprising
   a plate of electrooptically active material having first and second opposed major surfaces,
   said plate having a focal surface substantially perpendicular to said opposed major surfaces,
   said plate additionally having a cylindric surface opposite said focal surface,
   reflector means opposite said focal surface at said cylindric surface,
   at least one multi-mode light guide in abutting relation with said focal surface for illuminating a major portion of said reflector means, and
   first and second opposed electrode patterns for placing a selectable electric field between portions of said opposed major surfaces whereby said light illuminating said reflector means is directed at a first location on said focal surface for a first intensity of said electric field and at least partly in a second location thereon for a second intensity of said electric field.

2. Apparatus as described in claim 1 wherein a second multi-mode light guide is affixed in abutting relation to said focal surface in at least one of said first or second locations for coupling said directed light when present to utilization apparatus.

3. Apparatus as described in claim 1 wherein optical absorber means is affixed at said focal surface in at least one of said first or second locations for absorbing substantially all of said directed light when present.

4. Apparatus as described in claim 1 wherein said electro-optically active material is a material selected from the class of materials including $LiTaO_3$ and $LiNbO_3$.

5. Apparatus as described in claim 1 wherein first and second dielectric layers are disposed respectively on said first and second opposed major surfaces at said first and second opposed electrode patterns, said dielectric layers acting as wave guiding plates in the plane perpendicular to said active plate.

6. Apparatus as described in claim 1 wherein said focal surface is planar.

7. Apparatus as described in claim 6 wherein a linear array of at least two multi-mode light guides is affixed in abutting relation at said planar focal surface.

8. Apparatus as described in claim 6 wherein said reflector means is a circularly cylindric surface having a center of curvature lying substantially symmetrically at said planar focal surface.

9. Apparatus as described in claim 8 in which said circularly cylindric surface comprises an optically reflecting metal film affixed to said electrooptically active material.

10. Apparatus as described in claim 7 wherein said multi-mode light guides comprise fiber optic guides.

11. Apparatus as described in claim 7 wherein at least one of said first and second opposed electrode patterns comprises at least first and second symmetrically disposed tapered metal electrodes having respective large ends disposed adjacent said two multi-mode light guides at said focal surface.

12. Apparatus as described in claim 11 wherein the ends of said first and second symmetrically disposed tapered metal electrodes opposite said large ends join in a common point to form an inverted vee-shaped electrode composite.

13. Apparatus as described in claim 12 further including third and fourth electrodes disposed at opposite sides of said electrode composite, said third and fourth electrodes normally being at a potential opposite to that of said electrode composite.

14. Apparatus as described in claim 7 wherein at least one of said first and second opposed electrode patterns comprises at least first and second tapered metal electrodes having respective pointed ends disposed adjacent said two multi-mode light guides at said focal surface, said first and second tapered electrodes being symmetrically disposed on the respective sides of a third tapered metal electrode.

15. Apparatus as described in claim 14 additionally including fourth and fifth auxilliary metal electrodes disposed between said first and third and third and said third and second electrodes, said first, second, and third electrodes normally operating at a potential opposite to that of said fourth and fifth auxilliary metal electrodes.

16. Apparatus as described in claim 14 additionally including fourth and fifth auxilliary metal electrodes disposed between said first and third and said third and second electrodes, said first, second, third, and fourth electrodes normally operating at the same potential opposite to the uniform potential of said second opposed electrode pattern.

17. Apparatus as described in claim 5 wherein said dielectric layers have an index of refraction lower than the index of refraction of said optically active material.

18. Apparatus as described in claim 1 wherein said reflector means comprises thin film metallic means affixed to said cylindric surface.

19. Apparatus as described in claim 1 wherein said reflector means comprises:
   substrate means having a concave cylindric surface,
   thin film metallic reflector means affixed to said concave cylindric surface,
   said thin film contacting said plate cylindric surface in a line contact.

20. Apparatus as described in claim 1 wherein said opposed electrode patterns are so arranged and operated that said second location does not overlap said first location.

* * * * *